J. H. BARLEY.
Harrow.
No. 225,042. Patented Mar. 2, 1880.
Fig. 1.
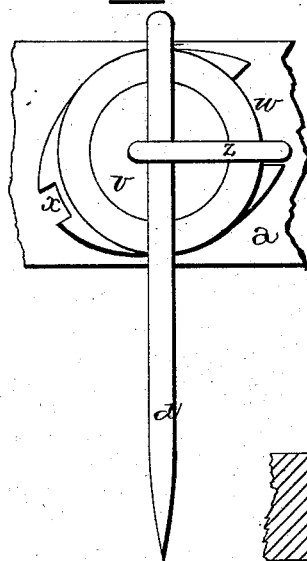
Fig. 2.
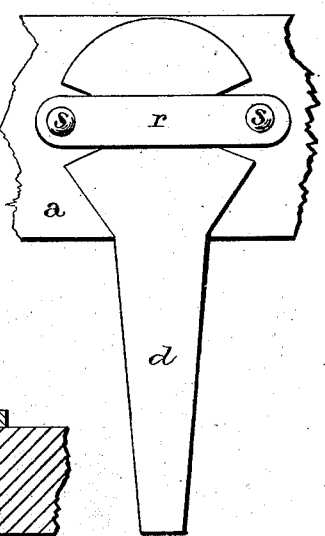
Fig. 6.
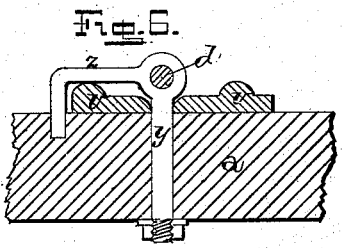
Fig. 3.
Fig. 4.
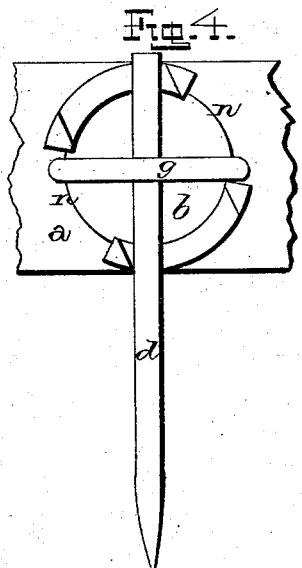
Fig. 5.
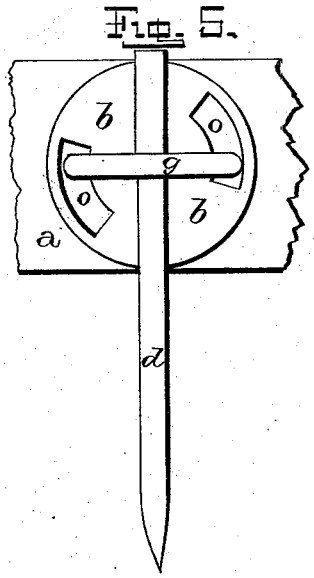
Fig. 7.
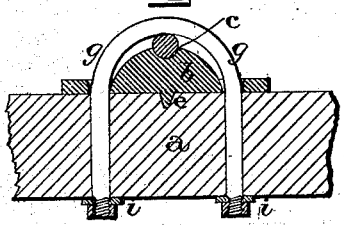
Witnesses:
N. W. Mortimer
Chas. H. Isham
Inventor:
Jas. H. Barley
per
F. A. Lehmann,
Atty.
N. PETERS, PHOTO-LITHOGRAPHER, WASHINGTON, D.C.

UNITED STATES PATENT OFFICE.

JAMES H. BARLEY, OF SEDALIA, MISSOURI.

HARROW.

SPECIFICATION forming part of Letters Patent No. 225,042, dated March 2, 1880.

Application filed January 27, 1880.

*To all whom it may concern:*

Be it known that I, JAMES HANLEY BARLEY, of Sedalia, in the county of Pettis and State of Missouri, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification.

My invention relates to an improvement in pivoted harrow-teeth; and it consists in the combination of a pivoted holding-plate, to which the tooth is rigidly clamped, and a staple, which straddles over the plate and tooth and holds them to the side of the bar of a harrow-frame at the same time that it regulates the distance the plate shall turn on its pivot, as will be more fully described hereinafter.

Figures 1, 2, 3, 4, 5 are side elevations of my invention, shown in slightly different forms. Figs. 6 and 7 are plan views of the same.

$a$ represents the bar of the harrow, and $b$ the pivoted holding-plate, having a groove, $c$, across its face, in which the harrow-tooth $d$ is held. This plate $b$ has a projection, $e$, on the center of its inner side, which fits into a socket in the side of the bar, and this projection holds the plate in position on the side of the bar as long as the staple straddles over its outer side. This staple $g$ passes over the outer side of the plate and tooth, as shown, and has its two ends passed through the bar $a$ and held firmly in place by means of the nuts $i$. These nuts can be so tightened as to produce just pressure enough on the tooth to hold it rigidly against its plate and yet leave the plate free to turn on its pivot whenever the forward motion of the harrow is reversed.

In opposite edges of the plate $b$ there are either the slots $o$ or recesses $n$, which are circular in shape, and through which the legs of the staple pass, as shown, for the purpose of regulating the distance the plates shall turn and the angle at which the teeth shall be presented to the ground. The plates $b$ turn on their pivots the full length of the slots or recesses until one end of each recess or slot strikes against its corresponding part of the staple, and thus the staple serves the double purpose of holding plate and tooth in position and acting as a stop.

The teeth may be either round or flat, as preferred. When made flat the plate requires a wider groove to hold it, and both edges are sharpened, so that it will act equally well when moving in either direction.

In Fig. 2 the plate and tooth are shown as made in one piece, the upper end of the tooth being widened out and having circular recesses in its opposite edges. Instead of a staple a flat plate, $r$, is used, and through its two ends and the two recesses are passed two bolts, $s$. On the inner side of the upper end of the tooth is a projection the same as on the plates.

In Fig. 1 is shown a pivoted plate, $v$, having a long recess, $w$, in one edge and a short one, $x$, in the opposite edge. Instead of being held in position, however, by means of a projection and staple, the plate is held by and pivoted upon the screw-bolt $y$. This bolt has an eye on its outer end, through which the harrow-tooth passes, and which serves to hold the tooth against the plate. Projecting out from one side of this eye is an L-shaped stop, $z$, which extends out over the edge of the plate and catches in the side of the bar. The plate, when the longer one of the recesses is on that side, can turn back and forth on the bolt a distance equal to the length of the recess; but when the plate is turned around, so that the stop catches in the short recess $x$, the plate and tooth are held rigidly in position.

In all of these forms of my invention when the harrow is drawn in one direction the pressure against the lower ends of the teeth causes the teeth to turn the plates into such a position that the teeth are held perfectly upright, whereas if the harrow is drawn the other end forward over the ground the teeth automatically assume a slanting position, as shown.

I am aware that a plate having the tooth clamped against its outer side by means of a bolt which has an eye on its outer end, and which plate allows the tooth a limited movement, is not new, and this I disclaim.

I am also aware that a harrow-tooth has been clamped between two recessed plates, and that the tooth has been held in a plate that is slotted at each of its ends, in both of which cases the tooth can be inclined in one or both directions.

Having thus described my invention, I claim—

The combination of a pivoted plate having recesses or slots, and against which the tooth is clamped, with a staple or bolt which straddles over plate and tooth and acts as a stop to the movement of the plate, substantially as shown.

In testimony that I claim the foregoing I have hereunto set my hand this 20th day of January, A. D. 1880.

JAMES H. BARLEY.

Witnesses:
J. D. CRAWFORD,
H. W. KERR.